United States Patent [19] [11] 3,742,179
Harnden, Jr. [45] June 26, 1973

[54] INDUCTION COOKING APPLIANCE INCLUDING WIRELESS TRANSMISSION OF TEMPERATURE DATA

[75] Inventor: John D. Harnden, Jr., Schenectady, N.Y.

[73] Assignee: General Electric Company, Schenectady, N.Y.

[22] Filed: Dec. 29, 1971

[21] Appl. No.: 213,357

[52] U.S. Cl........ 219/10.77, 73/343 R, 219/10.49, 219/501, 340/210
[51] Int. Cl. ............................................. H05b 5/04
[58] Field of Search..................... 219/10.49, 10.75, 219/10.77, 10.79, 450, 490, 501; 340/210; 307/117; 73/362 AR, 351

[56] References Cited
UNITED STATES PATENTS

| | | | |
|---|---|---|---|
| 3,393,296 | 7/1968 | Gambill | 219/450 |
| 3,710,062 | 1/1973 | Peters | 219/10.49 |
| 3,530,499 | 9/1970 | Schroeder | 219/10.49 |
| 3,576,554 | 4/1971 | Temps et al. | 340/177 |
| 3,359,801 | 12/1967 | Rasmussen | 73/362 AR |
| 3,581,062 | 5/1971 | Aston | 73/362 AR |
| 2,886,683 | 5/1959 | Klaritter | 73/362 AR |
| 3,265,851 | 8/1966 | Schroeder | 219/10.49 X |
| 3,268,880 | 8/1966 | Miller | 340/210 |
| 3,303,701 | 2/1967 | Matsuura et al. | 73/351 |

Primary Examiner—J. V. Truhe
Assistant Examiner—B. A. Reynolds
Attorney—John F. Ahern, Patrick D. Ward et al.

[57] ABSTRACT

Herein disclosed is an induction cooking range having a counter for supporting a food-containing vessel; the vessel being heated by an induction coil which is driven at ultrasonic, or higher, frequencies. A temperature sensing unit is employed which includes a temperature detection unit located proximate to the vessel and/or food therein and a temperature receiving unit which is remotely located from the temperature detection unit and vessel but operating, nevertheless, to receive radio frequency transmissions of temperature data from the temperature detection unit which is, in the first instance, powered by the main field produced by the induction coil. Also disclosed is a compact packaging arrangement of the various electronic components of the temperature detection unit.

4 Claims, 7 Drawing Figures

PATENTED JUN 26 1973

INDUCTION COOKING APPLIANCE INCLUDING WIRELESS TRANSMISSION OF TEMPERATURE DATA

CROSS-REFERENCES TO RELATED APPLICATIONS

A fuller appreciation of induction cooking appliances, generally, as well as some of the sophistications which may be embodied therein is to be had be referring to the following U.S. patent applications: Ser. No. 200,526, filed Nov. 19, 1971, in behalf of David L. Bowers et al., titled SOLID STATE INDUCTION COOKING APPLIANCE; Ser. No. 200,424, filed Nov. 19, 1971, in behalf of J. D. Harnden, Jr. et al., titled SOLID STATE INDUCTION COOKING APPLIANCES AND CIRCUITS. The entire right, title and interest in and to the inventions described in the aforesaid patent applications, as well as in and to the aforesaid applications, and the entire right, title and interest in and to the invention hereinafter described, as well as in and to the patent application of which this specification is a part, are assigned to the same assignee.

BACKGROUND OF THE INVENTION

This invention pertains to induction cooking appliances, generally; and, in particular, to an induction cooking appliance including means for sensing the actual temperature of food being cooked in an inductively heated vessel, or for sensing the temperature of the vessel itself.

Prior art electric ranges (i.e., those using resistance heater surface elements) and gas ranges present a number of problems with respect to temperature sensing. With such ranges the approach most often employed was to directly sense the temperature of the vessel, and a contact-type temperature sensor unit was usually employed; i.e., the temperature sensor unit was placed in direct contact with the outside of the cooking vessel being heated. However, sensing the temperature of the cooking vessel, in the manner done in the prior art, has not proved entirely satisfactory for the following reasons, among others:

First, with prior art electric and gas ranges the primary heating source (e.g. the surface mounted electrical resistance coils or the gas fed flames) spuriously heats the temperature sensing unit and, moreover, other heated parts of the range thermally perturb the temperature sensing unit as well.

Second, in prior art electric and gas ranges because of the relatively high temperatures involved, principally because of the nature of the primary heating source and its proximity to the vessel-contacting temperature sensor, the materials from which the temperature sensing units and their associated components may be fabricated are rather restricted.

Third, in prior art electric and gas ranges, principally because of the high temperatures occasioned by the nature of the primary heating source and its proximity to the contact-type temperature sensing units, effective thermal shielding, or insulation, is required.

Fourth, in prior art electric and gas ranges because of the severe thermal stresses created in the vessel contacting temperature sensing unit as a consequence of the high temperatures occasioned by the nature of the primary heating source and its proximity to the temperature sensing unit, relatively massive and sophisticated as well as somewhat mechanically complex spring arrangements and structures were required for the purpose of maintaining adequate contact between the temperature sensing unit and the cooking vessel.

The four problems, hereinbefore mentioned, are discussed in greater detail hereinafter.

In prior art electric and gas ranges the temperature sensing means and its associated components are directly heated, spuriously, in some measure by a high temperature primary heating source. For example, in the conventional electric range a temperature sensing unit is located at the center of a spirally wound resistance heating coil. This heating coil and the temperature sensing unit are both mounted on the top or working surface of the range counter. A cooking vessel rests on and contacts the heating coil as well as the temperature sensing unit. Although the temperature sensing unit directly contacts the heated cooking vessel, it is also subjected to direct spurious heating by the range's heating coil; e.g., by radiation and convection. In addition, the temperature of the temperature sensing unit is influenced by, among other things, the metallic counter of the electric range. Similarly in a gas range, the flames directly heat the temperature sensing unit. Moreover, heated metallic gridirons as well as the heated metallic counter top thermally influence the temperature sensing unit.

Also, in prior art electric and gas ranges, because of the nature of the primary heating source and its proximity to the temperature sensing unit, various component parts of the temperature sensing unit have to be fabricated with materials which are capable of withstanding relatively high temperatures; e.g., approximately 1400°F – 1600°F. For example, in the conventional prior art electric range wherein the temperature sensing unit is located at the center of the spiral resistance heating coil which is, in turn, mounted on the metallic counter top of the range, the temperature sensing unit and its associated components are subjected to the elevated temperatures hereinbefore set forth. Significant thermal stresses are, as a result, induced in the temperature sensing unit as well as in its associated components. Similar conditions occur in gas ranges.

In prior art electric and gas ranges, principally because of the nature of the primary heating source and its proximity to the temperature sensing unit contacting the cooking vessel, the temperature sensing unit as well as its associated components are required to have extensive thermal shielding, or insulation, for the purpose of minimizing the influences of spurious heating by the high temperature heating source as well as by the metallic range counter and metallic gridirons. Without some effective thermal shielding or insulation, the temperature sensing unit will provide a false indication of temperature unless temperature compensation is appropriately applied. However, such compensation is not feasible because of the wide range of cooking conditions. For example, it is very difficult to achieve a system in which both steady-rate and transient, or dynamic, compensation is easily achieved. In any event, cooking performance is compromised. Moreover, without effective thermal shielding severe thermal stresses induced in the various component parts of the temperature sensing unit will cause a disabling, or sometimes destruction, of the temperature sensing unit.

The prior art temperature sensing units, especially those which are employed with the prior art electric ranges for the purpose of contacting the cooking vessel, are generally massive and are of a rather sophisticated and somewhat mechanically complex structure and arrangement. The high temperature environment within which the temperature sensing unit is located permits severe thermal stresses to be induced in the various components of the temperature sensing unit. These stresses tend to promote warping of the various components. For example, because of the aforesaid thermal stresses, a relatively massive double-spring arrangement is usually employed in combination with a temperature responsive device. The temperature responsive device, acting against spring restraint, contacts the bottom surface of the cooking vessel. The vessel rests on a flat spiral heating coil disposed on the top surface of the range counter. The massive double-spring arrangement is rather stiff and this is due in large part to the need to make the arrangement structurally resistant to thermal deformation. Such a spring arrangement generally functions satisfactorily to enable the temperature sensing unit to contact a relatively smooth flat-bottom surface of a relatively heavy cooking vessel such as a cast iron pot containing foodstuff to be cooked. Being in contact with the surface of the vessel, it is conceptually possible for the temperature sensing unit to detect the temperature of the vessel. However, in the event that a relatively light weight pot is used or if a pot having a rather irregularly contoured bottom surface is used, such prior art contact type temperature sensing units employing the aforesaid stiff spring arrangement proved unsatisfactory. For example, if a cooking vessel is used which is not sufficiently heavy, there will be an insufficient weight to adequately compress the spring arrangement. One consequence will be that the vessel will not rest on the resistance heating coil in the most intimate contact possible therewith. The cooking vessel will, as a result, be raised or tilted and thereby allow inefficient heat transfer between the resistance heating coil and the vessel.

SUMMARY OF THE INVENTION

Although the invention is hereinafter described and illustrated in the accompanying drawing figures as being employed in combination with an induction range, or stove, it is, nevertheless, to be understood that the invention's applicability is not limited to induction cooking ranges but may be embodied in, for example, portable counter top warming or cooking appliances, such as warming trivets, as well as in other types of induction heating apparatus which need not necessarily be used for cooking food.

One object of the invention is the provision of a cooking appliance having a temperature sensing unit for directly sensing or detecting the actual temperature of foodstuff in a cooking vessel or utensil being heated.

Another object of the invention is the provision of a cooking appliance having a temperature sensing unit for directly sensing or detecting the actual temperature of the foodstuff in a vessel or utensil being heated, said temperature sensing unit being free from spurious heating.

Another object of the invention is the provision of a cooking appliance including a temperature sensing unit for directly sensing or detecting the actual temperature of food in a vessel being heated, the materials of fabrication of said temperature sensing unit not being restricted by the elevated temperatures heretofore encountered in prior art electric and gas ranges.

Another object of the invention is the provision of a cooking appliance including a temperature sensing unit for directly sensing or detecting the actual temperature of food in a vessel being heated, said temperature sensing unit not requiring thermal insulation or shielding in the ways, or to the extent, employed in prior art electric or gas ranges.

Another object of the invention is the provision of a cooking appliance including a temperature sensing unit for directly sensing or detecting the actual temperature of food in a vessel being heated; said temperature sensing unit being capable of accurately sensing the temperature of the food in the vessel regardless of the weight of the vessel and/or the food therein and/or regardless of whether the vessel has or has not an irregular surface or contour; said temperature sensing unit not requiring the prior art spring construction or arrangement.

Another object of this invention is the provision of a cooking appliance including a temperature sensing unit for directly sensing the temperature of food in a vessel being heated; said vessel being supported by a vessel supporting means having an uninterrupted working surface.

Another object of the invention is the provision of a cooking appliance having a temperature sensing unit for directly sensing, or detecting, the temperature of the vessel, or utensil, being heated and wherein the temperature sensing unit is free from spurious heating.

Another object of the invention is the provision of a cooking appliance having a temperature sensing unit for directly sensing or detecting the temperature of the vessel or utensil being heated; the materials of said sensing unit not be restricted in the same way as in the prior art electric and gas ranges.

Another object of the invention is the provision of a cooking appliance having a temperature sensing unit for directly sensing, or detecting, the temperature of the vessel or utensil being heated, said temperature sensing unit not requiring thermal shielding, or insulation, in the ways or to the extent employed in prior art electric or gas ranges.

Another object of the invention herein set forth is the provision of a cooking appliance having a temperature sensing unit for directly sensing, or detecting, the temperature of a vessel or utensil being heated, said temperature sensing unit being capable of accurately sensing the temperature of the vessel regardless of whether said vessel be of light weight and/or whether the vessel has an irregular surface; said temperature sensing unit not requiring the prior art spring construction or arrangement.

Another object of the invention is to provide a cooking appliance having combined therewith a temperature sensing unit of either of the types hereinbefore described (i.e., food contacting or vessel contacting) and wherein said appliance includes a vessel supporting means having an uninterrupted work surface thereon.

Another object of the invention is to provide a cooking appliance including wireless means for transmitting temperature data from the food or the vessel to a relatively remote location from the food and vessel.

Another object of the invention is to provide an induction cooking appliance including wireless means for transmitting temperature data from the food or vessel to a location remote therefrom, said wireless means being powered by a portion of the main induction field which is used to heat the vessel.

The invention, hereinafter described and illustrated in the accompanying drawings figures, enables the achievement of the aforementioned objectives, as well as others, in that there is provided an induction cooking appliance for heating a food-containing vessel which has at least one portion thereof in which heating current may be induced to heat said one portion and the food contained in said vessel. The cooking appliance is comprised of a vessel supporting means in which no substantial heating current is induced when said supporting means is subjected to a changing magnetic field. The vessel supporting means includes one surface which is adapted for supporting the food containing vessel. Advantageously, said one surface of the vessel supporting means may be an uninterrupted surface. The cooking appliance also includes an induction coil which is energizable from a suitable power source so as to provide a changing electromagnetic field of at least ultrasonic frequency. The changing electromagnetic field provided by the induction coil causes heating current to be induced in said one portion of the cooking vessel thereby heating the vessel and the food contained therein. Combined with the cooling appliance is a temperature sensing unit which is comprised of temperature detecting unit and a temperature receiving unit. Briefly, the temperature detection unit derives electromagnetic energy from the changing electromagnetic field produced by the induction coil and is instrumental in electromagnetically transmitting temperature data acquired by a vessel-contacting, or food-contacting, temperature sensor unit to the temperature receiving unit which may be remotely located on the cooking appliance. The temperature receiving unit includes a receiving coil which is electrically coupled with a temperature signal processing circuit. Temperature data received by the receiving coil is further processed in the temperature signal processing circuitry and a signal is developed which is representative of the temperature of interest.

One feature of the invention resides in the transmission of temperature data from a temperature detection unit to a remotely located temperature receiving unit at sufficiently high frequencies so that the energy obtained in the harmonic distortion of the main field produced by the induction coil is far less than the transmitted frequency which contains the temperature data.

Another feature of the invention resides in packaging the various electrical components, especially those components of which the temperature detection unit is comprised. The electrical components comprising the aforesaid temperature detection unit being embedded, or encapsulated, in a compact matrix of, for example, polyimide material in the form of a relatively thin, flat sheet-like member or mat. the aforesaid mat contains, in accordance with one embodiment of the invention, a temperature sensor unit which is adapted for making contact with the vessel. In accordance with another embodiment of the invention, the temperature sensor unit, which is in the form of a probe or immersion means for allowing contact with the food is coupled with the sheet-like member, or mat, which contains the other electrical components of the temperature detection unit.

Other objects and features, as well as a fuller understanding of the invention, will appear by referring to the following detailed description, claims and drawing figures.

DESCRIPTION OF THE DRAWING FIGURES

Figure 2:
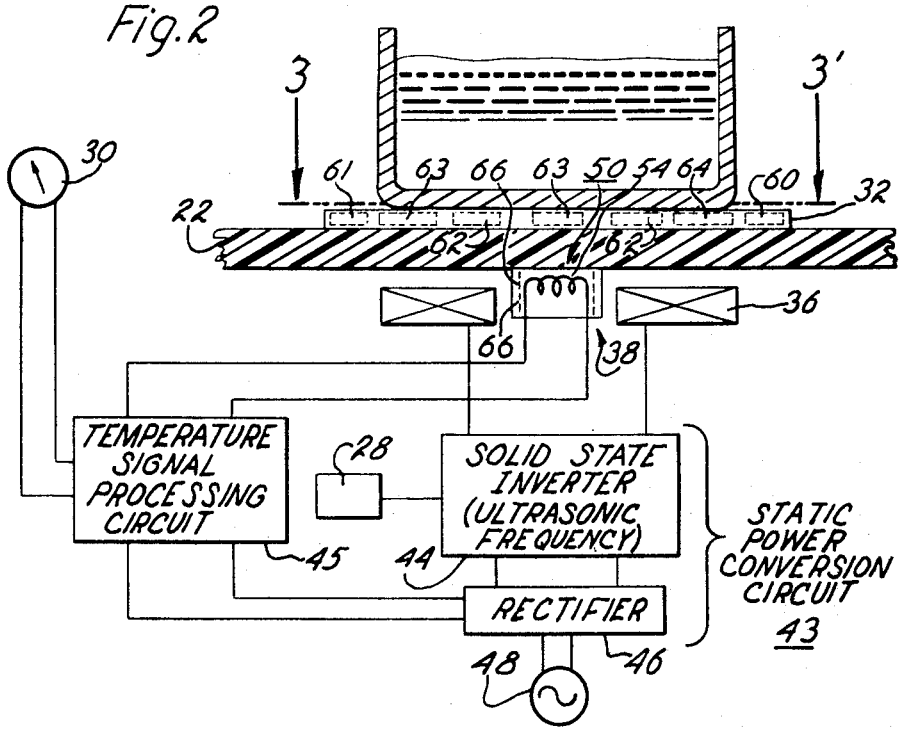
FIG. 2 is an enlarged cross section view taken along the section line 2—2' in FIG. 1; also illustrated is a block diagram of, among other things, an induction coil and power and control circuitry associated therewith.
Figure 3:
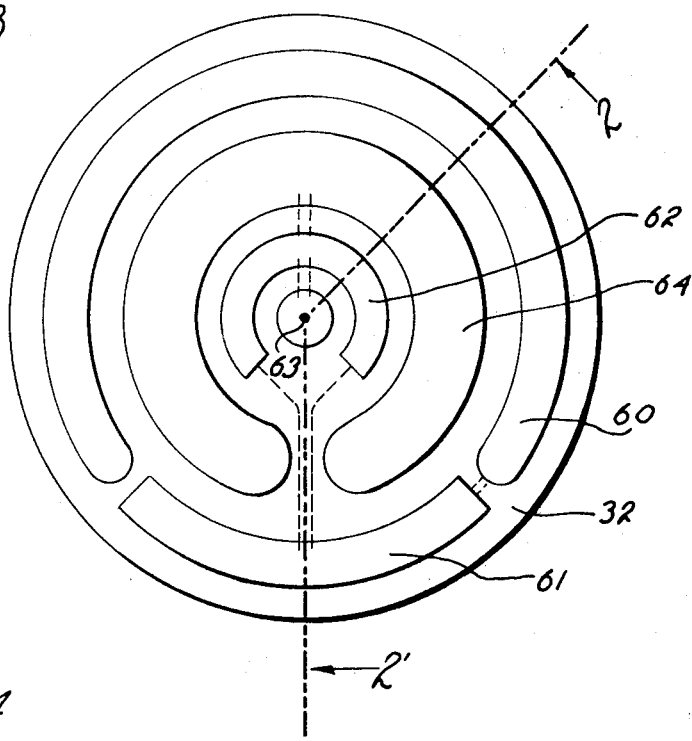

FIG. 3 is a plan view as viewed along the vantage lines 3—3' of FIG. 2 showing a temperature detection unit in accordance with one form of the present invention and indicating the location of various electronic and electrical components comprising the temperature detection unit. FIG. 3 also includes a section line 2—2' to indicate that the temperature detection unit which is shown in cross section in FIG. 2 is sectioned along the line 2—2'.

Figure 4:
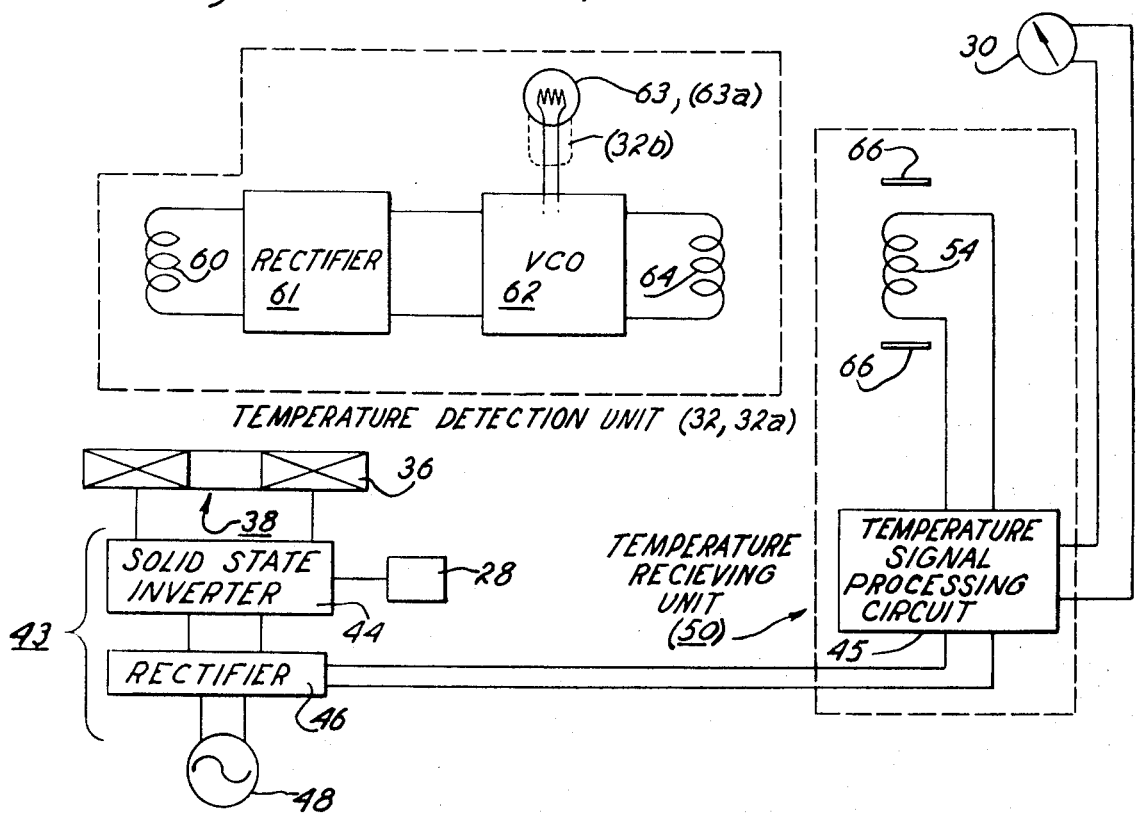

FIG. 4 is a block diagram showing the overall electronic or electrical system of the induction cooking appliance provided by the present invention. In particular, a temperature detection unit and temperature receiving unit comprising the temperature sensing unit according to the present invention is illustrated. Also illustrated is the induction coil along with a static power conversion circuit and power source which are associated with the induction coil.

Figure 5:
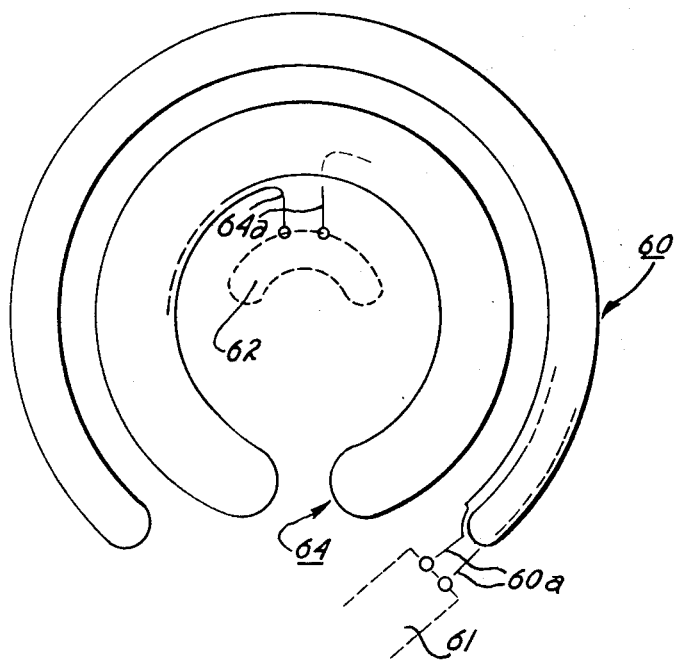

FIG. 5 is a view similar to FIG. 3. In particular, there is illustrated the manner in which a pick-up coil and transmit coil, which form part of the temperature detection unit, are spirally wound.

Figure 6:
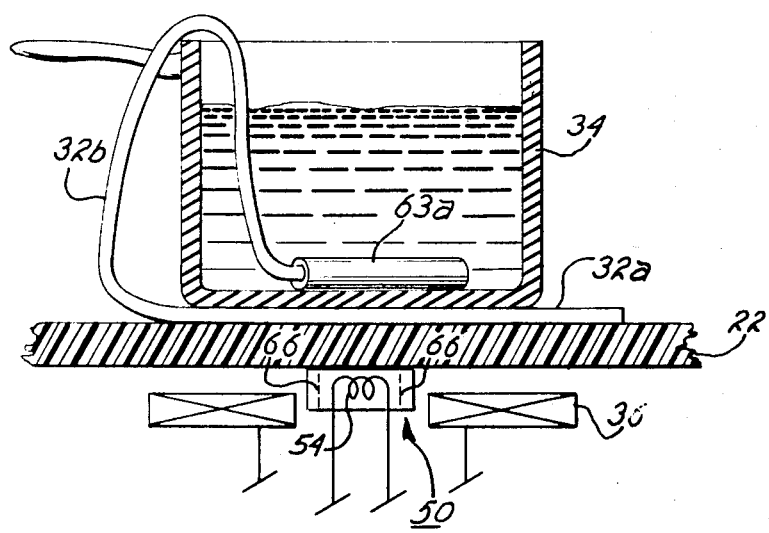

FIG. 6 is a partial cross section view similar to the view shown in FIG. 2. However, FIG. 6 illustrates a modified form of the temperature detection unit according to the present invention. As illustrated, a temperature sensor unit, which is part of the temperature detection unit, is immersed in foodstuff contained within a cooking vessel.

Figure 7:
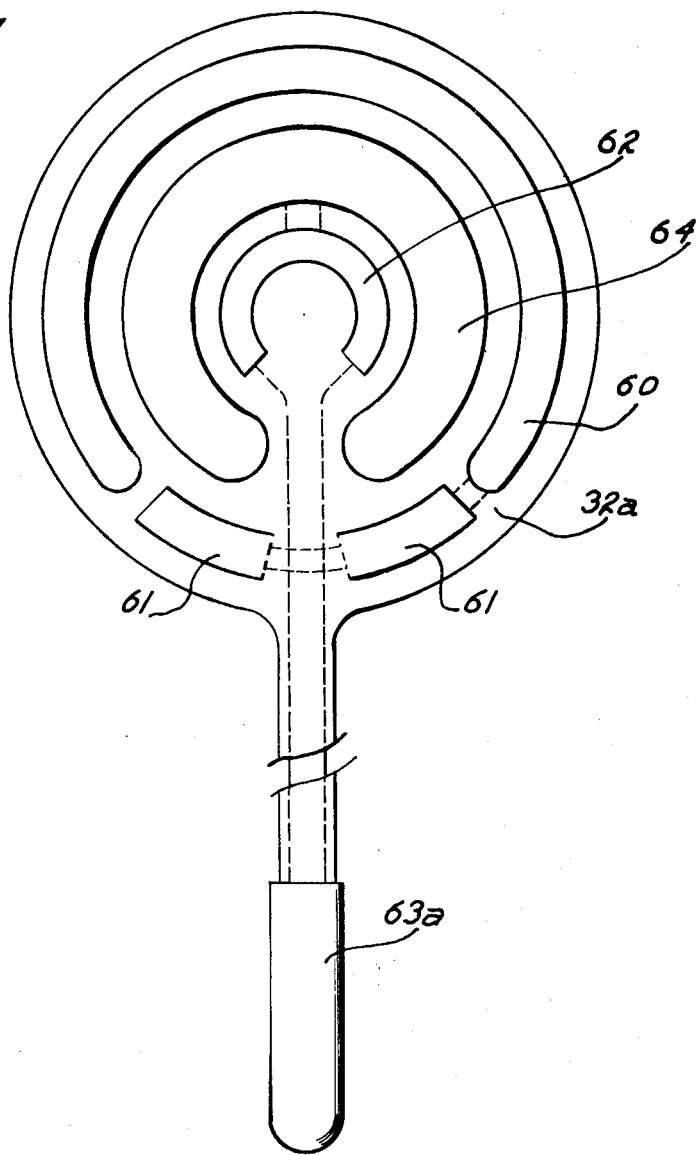

FIG. 7 is an illustration of the form of temperature detection unit employed in the system shown in FIG. 6. Specifically, an immersible temperature sensor unit of the probe type is shown as being arranged with and electrically coupled to the various components forming part of a temperature detection unit.

DESCRIPTION OF THE PREFERRED EMBODIMENTS

Figure 1:
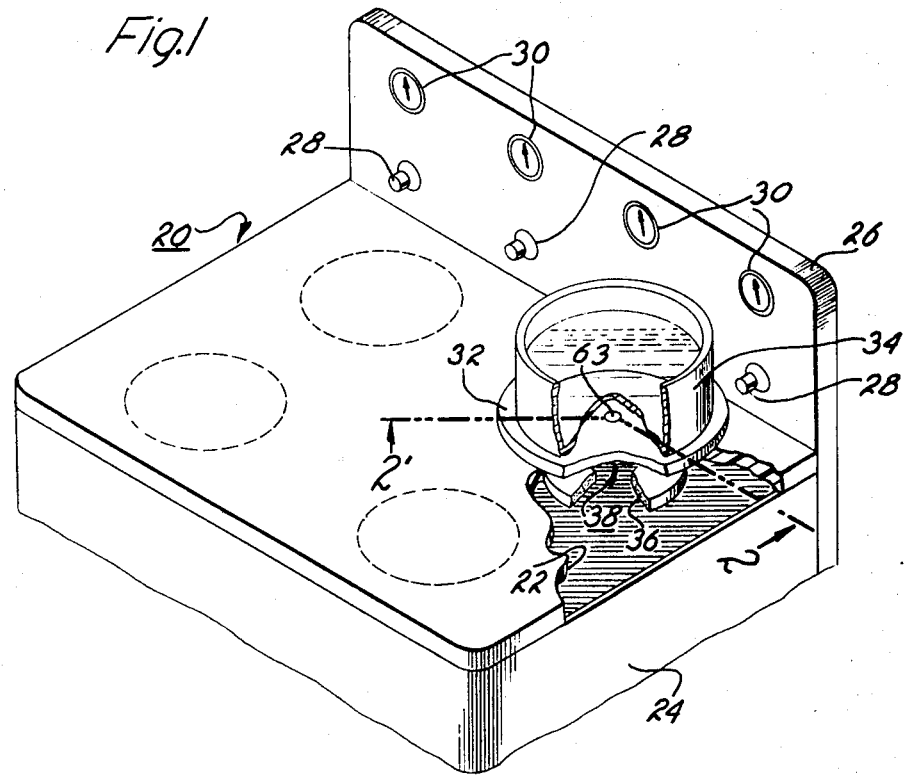
FIG. 1 is a perspective view of an induction cooking range illustrating the top or working surface thereof, on which there is supported a cooking vessel and a temperature detection unit forming part of the present invention.

Shown in FIG. 1 is an induction cooking range designated generally by the reference number 20. The range 20 is provided with a counter 22 which is suitably supported on a range substructure 24. Fastened to said substructure 24 and located at the rear of counter 22 is a panel 26. As illustrated, on panel 26 there is mounted a number of controls 28 and a like number of dial-type thermometers 30. On the top, or working surface, of the counter 22 there is shown four dotted line circles. These circles suggest the locations where four cooking vessels (e.g., pots, pans, etc.) may be positioned for cooking.

As shown in FIGS. 1 and 2, a mat 32 which serves as a matrix for the temperature detection unit of the present invention is rested on the working surface of counter 22, covering one of the dotted line circles.

Resting on top of the mat 32 is a cooking vessel 34. As shown in FIGS. 1 and 2 there is located beneath the counter 22 and separated from the bottom surface thereof by an air gap a relatively flat, spirally wound induction coil 36. The induction coil 36 has formed at the center thereof a central aperture designated, generally, by the reference number 38. The induction coil 36 is electrically connected to the output of a solid state inverter 44 which, in turn, has an input which is electrically connected to the output of a rectifier 46. The inverter 44 is a solid state inverter and, as combined with rectifier 46, forms a static power conversion circuit designated, generally, the reference number 43. Rectifier 46 includes an input which is electrically connected to a conventional A.C. source 48 which may be a 60 Hz, single phase, 110 or 220 volt source. More specific details of the static power conversion circuit 43 including rectifier 46 and inverter 44 may be had by referring to the patent applications hereinbefore noted under the heading CROSS REFERENCES TO RELATED APPLICATIONS.

Also shown in FIG. 2 is one of the controls 28 which may, for example, be a switch which is electrically coupled with inverter 44 for the purpose of controlling a flow of power therefrom to the induction coil 36. The control 28 is, preferably, marked in degree F settings to enable a housewife, for example, to "call for" a particular temperature or temperature range performance. However, a temperature indicator 30, which may be a dial-type thermometer, digital display, etc. is associated with a particular control 28 and provides a visible indication of the actual temperature of the vessel 34 in the manner hereinafter disclosed. In addition, the temperature indicator 30 provides an indication of the rate of temperature rise and fall. These rates of temperature change are considered to be an important aspect of the cooking process and, as far as is known, is newly available with this invention.

The rectifier 46 may be a regulated full-wave bridge rectifier employing solid state devices and operating to convert A.C. input power to D.C. output power. Also, inverter 44 preferably employs SCR's which in the performance of their control switching function enable the inverter 44 to deliver relatively high frequency power (i.e., ultrasonic or above) to drive the induction coil 36.

As suggested at FIG. 2 the mat 32 contains a temperature detection unit (discussed in detail with reference to FIGS. 3 and 4) which radiates a high frequency signal representative of the temperature of the cooking vessel 34. This radiated signal is received by a temperature receiving unit designated generally by the reference number 50 and is delivered to an input of a temperature signal processing circuit 45 (FIGS. 2 and 4). The signal processing circuit 45 then develops an output signal representative of the temperature of cooking vessel 34 and this output signal is delivered to the electrical dial-type thermometer 30 or temperature indicator.

As shown in FIG. 2 the temperature signal processing circuit 45 includes: a first input coupled to the rectifier 46 for deriving therefrom a D.C. voltage; a second input in the form of a pair of electrical conductors 52 which extend from a receiving coil 54 of temperature receiving unit 50; and, an output directly coupled to the temperature indicator, or thermometer 30.

In FIG. 2 the cooking vessel 34 is shown as being filled with a liquid food, or slurry, which is to be heated. The vessel 34 is a conventional pot which may be made of cast iron, magnetic stainless steel, etc.; i.e., an electrically conductive metal, or alloy, in which electrical heating current may be induced by the changing magnetic field produced by the induction coil 36. Because induction heating is used, the vessel 34 is not heated to a temperature higher than about 550°F. In specifying 550°F herein some margin for safety is included. Since no substantial amount of heating current is induced in counter 22, it may be fabricated from materials which are not usable in conventional electric or gas ranges. For example, the counter 22 may be fabricated from epoxies, plastics, polyimides, or glass treated to withstand temperatures of about 550°F, etc. If required for purposes of electrostatic shielding and/or structural enhancement and/or decoration, the counter 22 may include some metallic content. However, the inclusion of metallic material in counter 22 is necessarily limited to a small amount in order to permit substantially all of the power developed by the induction coil 36 to be coupled to the cooling vessel 34 for the purpose of heating it.

Referring now to FIGS. 2 and 4, the temperature sensing unit in accordance with the present invention is comprised of a temperature detection unit (which is incorporated in the matrix or mat 32) and a temperature receiving unit 50. While the induction coil 36 produces electromagnetic radiations in the ultrasonic or higher ranges for the purpose of inducing heating currents in the vessel 34, it also provides the energy for driving, or powering, the temperature detection unit located within the mat 32.

The various components of the temperature detection unit within the matrix or mat 32 are shown as being contained within the dotted line box which is appropriately labeled and numbered in FIG. 4. Similarly, the various components of the temperature receiving unit 50 are located within another dotted line box which is appropriately labeled in FIG. 4.

Operationally, electromagnetic energy developed by induction coil 36 is coupled (as shown in FIG. 2) through an air gap and through the counter 22 to the vessel 34. The major portion of this coupled energy developed by induction coil 36 is used for inducing heating currents in the vessel 34. However, as suggested in FIG. 4, a small portion of this radiated energy is coupled to a pick-up coil 60. The voltage developed across the pick-up coil 60 is delivered to an input of a rectifier 61. The rectifier 61 develops a regulated D.C. output which is delivered to an input of a voltage controlled oscillator 62. The voltage controlled oscillator 62 is referred to hereinafter as a VCO 62. VCO 62 also includes an additional input from a temperature sensor unit 63 which may be a thermistor unit or an RTD (resistance temperature detector) such as a metal film with suitable coefficient. A transmit coil 64 is coupled to the output of the VCO 62 as indicated in FIG. 4. Suffice it to say at this point that: the output frequency of VCO 62 is a very much greater frequency than the frequency output of induction coil 36. For example, the VCO 62, in the embodiment shown, develops an output signal voltage at a frequency of at least a megahertz, or multiple thereof. The coil 36, on the other hand, operates at about 18 kilohertz. Briefly, the thermistor unit 63 which is in contact with the bottom surface of the vessel 34 changes its resistance in response to the temperature of the vessel. The change in the resistance of thermistor unit 63 changes the operating voltage of VCO 62 and thereby causes the VCO 62 to change its frequency of oscillation in response to the voltage change introduced thereto by thermistor unit 63. Thus, there is developed across a transmit coil 64 a signal voltage of a frequency which varies as a function of the resistance of the thermistor unit 63; the thermistor unit 63 varying its resistance as a function of the temperature of the vessel 34. The high frequency developed across the transmit coil 64 is coupled electromagnetically with the receiving coil 54 which is part of the temperature receiving unit 50. As indicated at FIG. 2 the receiving coil 54 may, conveniently, be secured to the lower surface of the counter 22 proximate to the portable mat 32 so as to receive radiated electromagnetic energy from the transmit coil 64. As indicated, the receiving coil 54 of the temperature receiving unit 50 is located within the central aperture 38 of the induction coil 36. This is advantageous because in the central aperture 38 the intensity of the main electromagnetic field developed by induction coil 36 is at a relatively low value. The receiving coil 54 may, preferably, be embedded, or potted, within a suitable matrix of polyimide material. Also embedded in the same matrix with the coil 54 is a shielding means 66 which may be a ferrite for the purpose of shielding the coil 54 from the field radiated by the induction coil 36. As suggested in FIG. 2, the ferrite shielding means 66 are located within the matrix at opposite sides of the coil 54; i.e., between coil 54 and the induction coil 36. However, the coil 54 remains relatively unshielded at locations thereof which are most proximate to the transmit coil 64 so that radiations from the transmit coil 64 may be received by coil 54, unimpeded by shielding means 66. The shielding means 66 are also illustrated, diagrammatically, in FIG. 4.

Electromagnetic energy coupled to the receiving coil 54 from transmit coil 64 develops a voltage across the coil 54 which is delivered to an input of the temperature signal processing circuit 45. The signal processing circuit 45, which derives its input power from rectifier 46, develops an output signal representative of the temperature of the vessel 34 as detected by thermistor unit 63. This output signal is delivered directly to the electrical dial-type temperature indicator 30.

To summarize the operation: for a particular temperature developed at the vessel 34 thermistor unit 63 exhibits a particular resistance, or impedance, corresponding to said temperature. The resistance of the thermistor unit 63 causes a voltage change within the VCO 62. The output frequency of VCO 62 is a function of the voltage change occasioned by the resistance change of thermistor unit 63. The output frequency developed by the VCO 62 is impressed across transmit coil 64 which, in turn, electromagnetically drives the receiving coil 54. The coil 54 has a signal of a particular frequency and voltage developed thereacross and this signal is fed to the temperature signal processing circuit 45 which, in turn, develops an output signal corresponding to the temperature of the vessel. This output signal is converted and the temperature is displayed by the thermometer 30.

As an alternative mode of operation, VCO 62 may operate in a pulsed mode so as to cause transmit coil 64 to be energized in a clocked type fashion with the result that interference from the main field produced by the induction coil is avoided.

In FIG. 3 the location and arrangement of the various elements comprising the temperature detection unit are illustrated. Shown in FIG. 3 is a circular mat 32. The mat 32 has a relatively thin cross section. However, it is to be understood that the cross section dimension of the mat 32 as shown at FIG. 2 has been exaggerated for the purpose of adequately disclosing the invention. Actually, the cross section of the mat 32 may be relatively smaller than the thickness of the vessel material. The mat 32 may be made from a material such as epoxy, plastic, polyimide, etc. This material serves as a matrix for the various components which are embedded therein. Advantageously, the material from which the matrix or mat 32 is formed may be an elastomer so that it has sufficient resilience and flexibility. Partially embedded in the center of mat 32 is a thermistor unit 63. The thermistor unit 63 or temperature sensor unit may be comprised of thermistor material which is encapsulated in a glass frit or metal film resistor with suitable temperature coefficient. The unit 63 has one face thereof more or less flush with the top surface of the mat 32 so that the thermistor unit may make contact directly with the bottom surface of the vessel 34. However, the other components may be completely embedded within the matrix or mat 32. As shown in FIG. 3 the following components, in addition to thermistor unit 63, are embedded within the mat 32, pick-up coil 60, rectifier 61, VCO 62 and transmit coil 64. Rectifier 61 and VCO 62 are, preferably, fabricated and packaged as integrated circuits which may have the general forms or configurations illustrated in FIG. 3. Conventional planar technology is applicable since the transformer action involved permits the choice of suitably low voltages. Suffice it to say that: rectifier 61 and VCO 62 are integrated circuits which have been miniaturized and packaged accordingly. As indicated at FIG. 3, the pick-up coil 62 had leads which are directly connected to an input of rectifier 61. Rectifier 61, in turn, has output leads which are directly coupled to the input of VCO 62. Thermistor unit 63 is electrically connected to the VCO 62 by a suitable pair of electrical leads. Similarly, the output of the VCO 62 is connected to coil 64 by a pair of leads.

FIG. 5 is a diagrammatic illustration indicating the manner of winding the various turns of the coils 60 and 64. As shown the transmit coil 64 has a pair of leads which are coupled with the output of VCO 62.

As shown in FIG. 5, the transmit coil 64 is diagrammatically illustrated as being formed from a single conductor 64A which is spirally wound. The transmit coil 64, as shown in plan view has a generally C shape. Similarly, the pickup coil 60 is shown in FIG. 5 in diagrammatic form as being spirally wound from a single conductor 60A. The coil 60 also has a C shape or configuration.

As indicated at FIG. 2, the diameter of the circular mat 32 is somewhat larger than the diameter of the vessel 34. This is advantageous in that both the rectifier 61 and the pickup coil 60 may be disposed near the outer periphery of the circular mat 32. Thus, the rectifier 61 may easily dissipate the small amount of heat which it develops since it is not so disposed that it is between counter 22 and the bottom surface of the vessel 34. Similarly, the pickup coil 60 is disposed within the matrix or mat 32 in relation to the induction coil 36 so that it can intercept a sufficient amount of the electromagnetic energy radiated by induction coil 36. Also, the transmit coil 64 is located nearer the center of the mat 32 so as to provide a closer electromagnetic coupling relation with the receiving coil 54. Advantageously, the mat 32 is portable and there are no conductors connecting any of the components embedded therein to any other components which are external to the mat. Also, the same mat 32 may be used at any of the dotted line circles on the top surface of the induction range 20 and may be conveniently disposed beneath any cooking vessel.

FIGS. 6 and 7 are illustrations depicting a modification of the temperature detection unit according to the present invention. In the embodiment of the invention, shown at FIG. 6, there is provided a thermistor unit or temperature sensing unit 63A which, unlike the embodiment shown in FIGS. 2 and 3, is a probe or immersion type of temperature sensor unit. The temperature sensor unit 63A is comprised of thermistor material encapsulated in a glass frit which is further contained or encapsulated in a probe unit, which, for example, may be a metallic sheath or probe of low resistivity and good thermal conductivity such as, for example, aluminum. Also, the encapsulated material may be sheathed in the same material as the mat or matrix and may, in practice, be a continuation of the matrix in the form of a film. The system illustrated at FIG. 6 operates in the same manner as the system shown at FIGS. 2 and 4. With reference to FIG. 4, the temperature sensor 63A is integral but extensible from the mat or matrix 32A. (See FIG. 7). As shown in FIG. 7, a matrix or mat 32A of polyimide, plastic, or epoxy material which is sufficiently flexible includes a tail piece 32B which extends between the main body of the mat 32A and the immersion type temperature sensor unit 63A. Embedded within the mat 32A are a pickup coil 60, a rectifier 61, VCO 62, and transmit coil 64. The coils 60 and 64 may be spirally wound in the manner suggested at FIG. 5. The operation of the system of FIG. 6 is exactly the same as that illustrated in the block diagrams shown in FIG. 4. The temperature sensor 63A is not embedded in the mat 32A but is integrally connected therewith by virtue of the tail piece 32B, as shown in FIG. 7. Moreover, the temperature sensor unit 63A is immersed in the food in vessel 34 so that the actual temperature of the foodstuff being cooked can be sensed.

Thus, the invention hereinbefore disclosed and illustrated in the accompanying drawings provides an induction cooking appliance including a temperature sensing unit which is free from the spurious heating encountered in prior art electric and gas ranges. In this regard, the nature of the heating source does not produce the same elevated temperatures at the same locations or within the same components. For example, the induction coil 36 induces heating currents in the vessel 34 rather than in the counter 22. The temperature detection unit associated with the mat 32 or 32A includes a temperature sensor unit 63, or 63A, which is located in a region of relatively low magnetic field intensity with respect to the induction coil 36. The various components embedded within the matrix or mat are not subjected to a temperature as high as the specification temperature of 550°F. Certainly, these components are not subjected to the elevated temperatures of as high as 1600°F which occur in the prior art electric and gas ranges.

Advantageously, with the present invention, the materials of fabrication of the temperature sensing unit (temperature detection unit and components as well as the temperature receiving unit and components) are not restricted by the elevated temperatures encountered with prior art electric and gas ranges. With prior art ranges temperatures of 1400° F - 1600°F are encountered whereas in the induction cooking appliance herein disclosed temperatures no higher than 550°F are encountered. Thus, with the mat herein employed there is no danger involved from electric shock or high temperatures. Of course, in prior art ranges one could not place a mat on the cooling surface. Hence, many materials such as plastics, epoxies, and polyimides are usable with the present invention.

Moreover, because of the nature and proximity of the primary heat producing source, the induction coil, the temperature sensing unit of the present invention need not be thermally shielded or insulated in the ways or to the extent employed with prior art electric or gas ranges.

With the temperature sensing unit employed in the present invention an accurate sensing of either the food in the vessel or the vessel itself may be achieved, regardless of the weight of the vessel and regardless of whether the vessel has or has not an irregular surface or contour. Moreover, the temperature sensing unit employed herein does not require the prior art spring construction or arrangement.

Another advantageous aspect of the subject invention is that the counter 22 or vessel supporting means may have an uninterrupted working surface. Another advantageous aspect of the presently disclosed invention is that temperature data may be transmitted by wireless means to a location which is relatively remote from the food and from the cooking vessel.

Although the invention has been described and illustrated by means of specific embodiments thereof, it is to be understood that many changes in materials, details of construction, as well as in the combination and arrangement of parts or components may be made without departing from the spirit and scope of the invention as hereinafter claimed.

What is claimed:

1. An induction cooking appliance, for heating a food-containing portable vessel having at least one portion thereof in which heating current may be induced to heat said one portion, comprising: vessel supporting means in which no substantial heating current is induced when said supporting means is subjected to a changing magnetic field; an induction coil energizable for producing a main changing magnetic field whereby heating current is induced in said one portion when said vessel is supported by said supporting means; means for energizing said coil with electric power of at least ultrasonic frequency; a temperature detection unit comprising a pick-up coil coupled with said main field and developing therefrom a first voltage, a rectifier for converting said first voltage to a rectified second voltage, a voltage controlled oscillator energized by said second voltage for producing a variable frequency output signal, a temperature sensor unit for providing an impedance corresponding to a temperature sensed by said sensor unit, said temperature sensor unit being electrically coupled with said voltage controlled oscillator whereby said oscillator produces an output signal of a frequency corresponding to the temperature sensed by said temperature sensor unit, and a transmitting coil electrically coupled with said voltage controlled oscillator for producing another changing magnetic field corresponding to the output signal produced by said oscillator; a temperature receiving unit comprising a receiving coil coupled with the changing magnetic field produced by said transmitting coil for producing a third voltage, a temperature signal processing circuit energizable by said third voltage for producing an output signal corresponding to the temperature sensed by said temperature sensor unit; and, a portable mat in which said pick-up coil, rectifier, oscillator, and transmitting coil are embedded, said temperature sensor unit being partially embedded in said mat, said temperature sensor unit having an exposed portion adapted for making contact with said vessel to sense the temperature thereof, said mat being positionable between said vessel supporting means and said vessel and in contact with said vessel and said supporting means.

2. An induction cooking appliance, for heating a food-containing portable vessel having at least one portion thereof in which heating current may be induced to heat said one portion, comprising: vessel supporting means in which no substantial heating current is induced when said supporting means is subjected to a changing magnetic field; an induction coil energizable for producing a main changing magnetic field whereby heating current is induced in said one portion when said vessel is supported by said supporting means; means for energizing said coil with electric power of at least ultrasonic frequency; a temperature detection unit comprising a pick-up coil coupled with said main field and developing therefrom a first voltage, a rectifier for converting said first voltage to a rectified second voltage, a voltage controlled oscillator energized by said second voltage for producing a variable frequency output signal, a temperature sensor unit for providing an impedance corresponding to a temperature sensed by said sensor unit, said temperature sensor unit being electrically coupled with said voltage controlled oscillator whereby said oscillator produces an output signal of a frequency corresponding to the temperature sensed by said temperature sensor unit, and a transmitting coil electrically coupled with said voltage controlled oscillator for producing another changing magnetic field corresponding to the output signal produced by said oscillator; a temperature receiving unit comprising a receiving coil coupled with the changing magnetic field produced by said transmitting coil for producing a third voltage, a temperature signal processing circuit energizable by said third voltage for producing an output signal corresponding to the temperature sensed by said temperature sensor unit; and, a portable mat in which said pick-up coil, rectifier, oscillator, and transmitting coil are embedded, said temperature sensor unit being a probe-type temperature sensor unit which is electrically connected with said oscillator in said mat, said probe-type sensor unit extending from said mat for making contact with food within the vessel while said mat is located outside the vessel on said vessel supporting means.

3. In combination with an induction cooking appliance wherein a food-containing portable vessel supported by a non-inductively-heatable support means is inductively heated by a main changing magnetic field produced by an induction coil, a temperature sensing unit comprising: an oscillator energizable for producing an electrical output signal; a sensor unit for sensing the temperature of the vessel and producing an electrical impedance corresponding to the sensed temperature and varying the output signal of said oscillator in accordance with variations of said impedance; first means responsive to the main changing magnetic field for producing a voltage for energizing said oscillator; second means for converting the varying output signals of said oscillator to an auxiliary magnetic field which varies in accordance with said varying output signals; third means responsive to said auxiliary magnetic field for producing output signals representative of the temperature sensed by said sensor unit; and a relatively thin portable mat in which said oscillator, sensor unit, first means, and second means are embedded and wherein a portion of said sensor unit is exposed for contacting said vessel, said portable mat being adapted for being supported by said support means and positioned between said support means and said vessel.

4. In combination with an induction cooking appliance wherein a food-containing portable vessel supported by a non-inductively heatable support means is inductively heated by a main changing magnetic field produced by an induction coil, a temperature sensing unit comprising: an oscillator energizable for producing an electrical output signal, a sensor unit for sensing the temperature of the food and producing an electrical impedance corresponding to the sensed food and varying the output signal of said oscillator in accordance with variations of said impedance; first means responsive to the main changing magnetic field for producing a voltage for energizing said oscillator; second means for converting the varying output signals of said oscillator to an auxiliary magnetic field which varies in accordance with said varying output signals; and, third means responsive to said auxiliary magnetic field for producing output signals representative of the temperature sensed by said sensor unit; and, a relatively thin portable mat in which said oscillator, first means, and second means are embedded, said mat being adapted for being supported by said support means and positioned between said support means and said vessel, said sensor unit being a probe-type sensor unit electrically connected with said oscillator in said mat and extending from said mat so as to contact food in the vessel.

* * * * *